(12) United States Patent
Pandev et al.

(10) Patent No.: US 10,215,559 B2
(45) Date of Patent: *Feb. 26, 2019

(54) METROLOGY OF MULTIPLE PATTERNING PROCESSES

(71) Applicant: KLA-Tencor Corporation, Milpitas, CA (US)

(72) Inventors: Stilian Ivanov Pandev, Santa Clara, CA (US); Dzmitry Sanko, Vallejo, CA (US); Alexander Kuznetsov, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,534

(22) Filed: Oct. 9, 2015

(65) Prior Publication Data

US 2016/0109230 A1 Apr. 21, 2016

Related U.S. Application Data

(60) Provisional application No. 62/064,973, filed on Oct. 16, 2014.

(51) Int. Cl.
*G01B 11/00* (2006.01)
*G01B 11/27* (2006.01)
(Continued)

(52) U.S. Cl.
CPC ............ *G01B 11/272* (2013.01); *G01B 11/14* (2013.01); *G01B 11/24* (2013.01); *G01B 2210/56* (2013.01)

(58) Field of Classification Search
CPC ....... G01B 11/272; G01B 11/14; G01B 11/24; G01B 2210/56; H01L 22/12; H01L 22/30; G03F 7/70625; G03F 7/0002
(Continued)

(56) References Cited

U.S. PATENT DOCUMENTS

| | | |
|---|---|---|
| 5,608,526 A | 3/1997 | Piwonka-Corle et al. |
| 5,859,424 A | 1/1999 | Norton et al. |

(Continued)

FOREIGN PATENT DOCUMENTS

| | | |
|---|---|---|
| CN | 101359611 A | 2/2009 |
| CN | 101393015 A | 3/2009 |
| WO | 2004088721 A3 | 4/2005 |

OTHER PUBLICATIONS

International Search Report dated Dec. 28, 2015, for PCT Application No. PCT/US2015/055521 filed on Oct. 14, 2015 by KLA-Tencor Corporation, 3 pages.

*Primary Examiner* — Isiaka Akanbi
(74) *Attorney, Agent, or Firm* — Spano Law Group; Joseph S. Spano

(57) ABSTRACT

Methods and systems for evaluating the performance of multiple patterning processes are presented. Patterned structures are measured and one or more parameter values characterizing geometric errors induced by the multiple patterning process are determined. In some examples, a primary, multiple patterned target is measured and a value of a parameter of interest is directly determined from the measured data by a Signal Response Metrology (SRM) measurement model. In some other examples, a primary, multiple patterned target and an assist target are measured and a value of a parameter of interest is directly determined from the measured data by a Signal Response Metrology (SRM) measurement model. In some other examples, a primary, multiple patterned target is measured at different process steps and a value of a parameter of interest is directly determined from the measured data by a Signal Response Metrology (SRM) measurement model.

20 Claims, 10 Drawing Sheets

(51) Int. Cl.
*G01B 11/14* (2006.01)
*G01B 11/24* (2006.01)

(58) Field of Classification Search
USPC ............... 356/366–369, 600–636, 399–401; 702/189
See application file for complete search history.

(56) References Cited

U.S. PATENT DOCUMENTS

| | | |
|---|---|---|
| 6,429,943 B1 | 8/2002 | Opsal et al. |
| 6,633,831 B2 | 10/2003 | Nikoonahad et al. |
| 6,734,967 B1 | 5/2004 | Piwonka-Corle et al. |
| 6,816,570 B2 | 10/2004 | Janik et al. |
| 6,895,075 B2 | 5/2005 | Yokhin et al. |
| 6,972,852 B2 | 12/2005 | Opsal et al. |
| 7,478,019 B2 | 1/2009 | Zangooie et al. |
| 7,715,022 B2 * | 5/2010 | Morimoto ............. G01B 11/24 356/237.2 |
| 7,826,071 B2 | 11/2010 | Shchegrov et al. |
| 7,929,667 B1 | 4/2011 | Zhuang et al. |
| 7,933,026 B2 | 4/2011 | Opsal et al. |
| 8,007,968 B2 * | 8/2011 | Yamada ............. H01L 21/0274 356/636 |
| 8,885,150 B2 * | 11/2014 | Pellemans ........... G03F 7/70633 356/4.01 |
| 2004/0017575 A1 * | 1/2004 | Balasubramanian ........................ G01N 21/4788 356/625 |
| 2008/0241975 A1 * | 10/2008 | Bischoff ............ G01N 21/4788 438/16 |
| 2008/0273210 A1 * | 11/2008 | Hilde ................... G01S 7/4802 356/601 |
| 2009/0248339 A1 * | 10/2009 | Tian .................... G01N 21/956 702/82 |
| 2009/0296075 A1 | 12/2009 | Hu et al. |
| 2013/0114085 A1 | 5/2013 | Wang et al. |
| 2013/0158957 A1 | 6/2013 | Lee |
| 2014/0111791 A1 | 4/2014 | Manassen et al. |
| 2014/0172394 A1 | 6/2014 | Kuznetsov et al. |
| 2014/0195194 A1 | 7/2014 | Brill et al. |
| 2014/0222380 A1 | 8/2014 | Kuznetsov et al. |
| 2014/0233031 A1 | 8/2014 | van der Schaar et al. |
| 2014/0297211 A1 | 10/2014 | Pandev et al. |
| 2015/0042984 A1 * | 2/2015 | Pandev ............... G03F 7/70641 356/124 |
| 2015/0046118 A1 | 2/2015 | Pandev et al. |

* cited by examiner

METROLOGY OF MULTIPLE PATTERNING PROCESSES

CROSS REFERENCE TO RELATED APPLICATION

The present application for patent claims priority under 35 U.S.C. § 119 from U.S. provisional patent application Ser. No. 62/064,973, entitled "Metrology of Multi-Patterning Processes," filed Oct. 16, 2014, the subject matter of which is incorporated herein by reference in its entirety.

TECHNICAL FIELD

The described embodiments relate to metrology systems and methods, and more particularly to methods and systems for improved measurement of parameters characterizing the dimensions of structures generated by multiple patterning processes.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Multiple patterning techniques are now commonly employed to increase the resolution of features printed onto the semiconductor wafer for a given lithographic system. FIGS. 1A-1D depict a double patterning lithography (DPL) technique commonly referred to as a litho-etch-litho-etch (LELE) process. FIG. 1A depicts a silicon base layer 10, an interface layer such as silicon dioxide, a device layer 12, a hard mask layer 13, a sacrificial layer 14, and a patterned resist layer 15 that results from a lithography patterning step. The structure of depicted in FIG. 1A is then subjected to exposure and etch steps that result in the structure illustrated in FIG. 1B. In this structure, the pattern of resist layer 15 has been effectively transferred to the hard mask layer 13. Both the sacrificial layer 14 and the patterned resist layer 15 have been removed. A number of deposition and lithographic steps are employed to arrive at the structure illustrated in FIG. 1C. FIG. 1C illustrates another sacrificial layer 16 and patterned resist layer 17 built on top of the hard mask layer 13. Patterned resist layer 17 includes a pattern having the same pitch as the first patterned resist layer 15, and also the same pitch as the pattern etched into the hard mask layer 13. However, the patterned resist layer 17 is offset from the pattern of the hard mask layer 13 by half of the pitch of the patterned resist layer 17. The structure of depicted in FIG. 1C is then subjected to exposure and etch steps that result in the structure illustrated in FIG. 1D. In this structure, the pattern of resist layer 17 has been effectively transferred to the hard mask layer 13. Both the sacrificial layer 16 and the patterned resist layer 17 have been removed. FIG. 1D illustrates a pattern etched into hard mask 13 that is double the pitch of the patterned resist layers 15 and 17 generated by the mask of the lithographic system.

FIG. 1D also depicts the effects of a non-optimized DPL process. Ideally, the nominal pitch of the double patterned structure should be a constant value, P. However, due to imperfections in the DPL process, the pitch of the resulting structure may vary depending on location due to grating non-uniformities. This is commonly termed "pitch walk." A variation from the nominal pitch, P, is depicted as $\Delta P$ in FIG. 1D. In another example, a critical dimension of each resulting structure should be the same nominal value, CD. However, due to imperfections in the DPL process, a critical dimension (e.g., middle critical dimension, bottom critical dimension, etc.) of the resulting structure may vary depending on location. A variation from the critical dimension, CD, is depicted as $\Delta CD$ in FIG. 1D.

Pitch walk and $\Delta CD$ are exemplary geometric errors induced by imperfections in the DPL process such as misalignment between the two lithography layers, non-uniformities in the focus and exposure of the lithographic process, mask pattern errors, etc. Both pitch walk and $\Delta CD$ introduce a unit cell that is larger than expected. Although pitch walk and $\Delta CD$ are described in particular, other multiple patterning errors may be contemplated.

Although the LELE process is described with reference to FIGS. 1A-1D, many other multiple patterning processes that induce similar errors may be contemplated (e.g., litho-litho-etch, spacer defined double patterning, etc.). Similarly, although a double patterning process is described with reference to FIGS. 1A-1D, similar errors arise in higher order patterning processes such as quadruple patterning. Typically, errors such as pitch walk and $\Delta CD$ are more pronounced in structures that result from higher order patterning processes.

Metrology processes are used at various steps during a semiconductor manufacturing process to detect defects on wafers to promote higher yield. Optical metrology techniques offer the potential for high throughput measurement without the risk of sample destruction. A number of optical metrology based techniques including scatterometry and reflectometry implementations and associated analysis algorithms are commonly used to characterize critical dimensions, film thicknesses, composition and other parameters of nanoscale structures.

Optical metrology techniques employing physical, model based measurements typically require a parameterized, geometric model of the patterned structure. Example parameters include critical dimension, pitch walk, or other parameters of interest. In addition, an accurate electromagnetic model of the interaction between the optical system and the structure under measurement is required to simulate signals generated during measurement. Nonlinear regression of simulated signals against measured signals is applied to determine parameters of the modeled structure. This approach requires accurate modeling of the structure and the material properties. Such models require long periods of time to assemble, compute, and reach a measurement result. Often, the measurement process suffers from weak sensitivity to critical parameters, and in some cases physical model based measurement techniques result in low sensitivity and poor precision. The lack of sensitivity of measured optical signals to these critical parameters makes it extremely difficult to monitor and control the patterning process.

CD-SEM measurement techniques utilize a focused beam of electrons to scan the surface of the patterned structure. Parameters of interest are calculated based on the images produced by the CD-SEM measurement. Although CD-SEM is capable of high resolution measurements, the technique suffers from low throughput and poor precision. These limitations prevent CD-SEM from being employed as a high-throughput metrology tool to characterize multiple patterned structures.

Metrology applications involving the measurement of structures generated by multiple patterning processes present challenges due to increasingly small resolution requirements, multi-parameter correlation, increasingly complex geometric structures, and increasing use of opaque materials. Thus, methods and systems for improved measurements are desired.

SUMMARY

Methods and systems for evaluating the performance of multiple patterning processes are presented. More specifically, geometric structures generated by a multiple patterning process are measured and one or more parameter values characterizing geometric errors induced by the multiple patterning process are determined in accordance with the methods and systems described herein.

In one aspect, measurements of structures formed by a multiple patterning process are performed based on a signal response metrology (SRM) technique. A SRM measurement model is formulated and trained based on optical measurement data (e.g., optical spectral data) associated with measurements of target structures. The parameters of interest associated with these target structures have known values determined by a reference metrology system. The trained SRM measurement model provides a transfer function that directly relates optical measurement data collected by the optical measurement tool to values of parameters of the patterned structure. In this manner, the trained SRM measurement model is capable of performing inline optical metrology of structures formed by multiple patterning processes.

In a further aspect, the SRM measurement model is created based only on raw measurement data collected from measurement sites including multiple patterned metrology targets. Machine learning, feature extraction, and other techniques are employed to build a direct input-output model (i.e., transfer function) that relates DOE spectra of one or more multiple patterned targets and corresponding reference measurements of the parameter of interest. In some embodiments, the training set of multiple patterned metrology targets includes targets that are nominally the same, i.e., the targets vary from one another because of process variations. In some embodiments, the process variations that impact the parameters of interest are intentionally amplified for purposes of model training.

In another further aspect, a SRM measurement model is trained on measurement signals from multiple targets integrated into a multi-target set. This approach de-correlates critical parameters from each other and from other process variations.

In yet another further aspect, a SRM measurement model is trained and used based on measurements of a metrology target at multiple steps of a multiple patterning process. Measured spectra from one or more previous process steps are fed forward for training and use of the SRM measurement model associated with the primary target. This approach also de-correlates critical parameters from each other and from other process variations.

In yet another aspect, the measurement model results described herein are used to provide active feedback to a process tool (e.g., lithography tool, etch tool, deposition tool, etc.). For example, values of the structural parameters determined using the methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for evaluating the performance of multiple patterning processes are presented. More specifically, geometric structures generated by multiple patterning processes are measured and one or more parameter values characterizing geometric errors induced by the multiple patterning processes are determined in accordance with the methods and systems described herein.

In one aspect, measurements of structures formed by multi-patterning processes are performed based on a signal response metrology (SRM) technique. A SRM measurement model is formulated and trained based on optical measurement data (e.g., optical spectral data) associated with measurements of target structures. The parameters of interest associated with these target structures have known values determined by a reference metrology system. The trained SRM measurement model provides a transfer function that directly relates optical measurement data collected by the optical measurement tool to values of parameters of the patterned structure. In this manner, the trained SRM measurement model is capable of performing inline optical metrology of structures formed by multiple patterning processes.

Figure 1A:
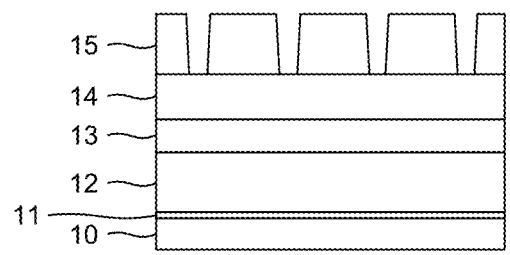
FIGS. 1A-1D depict selected steps of a double patterning lithography (DPL) technique commonly referred to as a litho-etch-litho-etch (LELE) process.
Figure 1B:
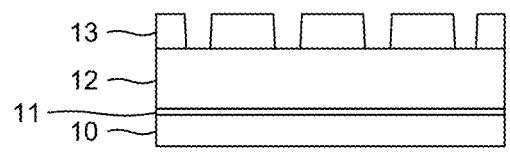
Figure 1C:
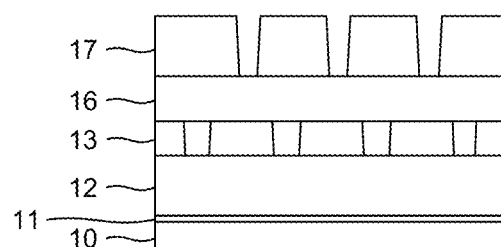
Figure 1D:
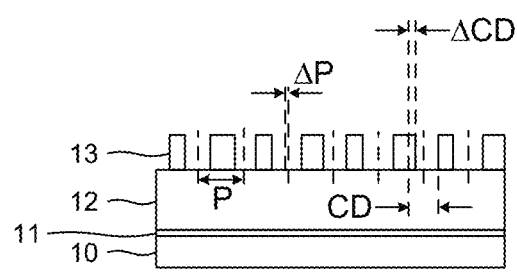
Figure 2:
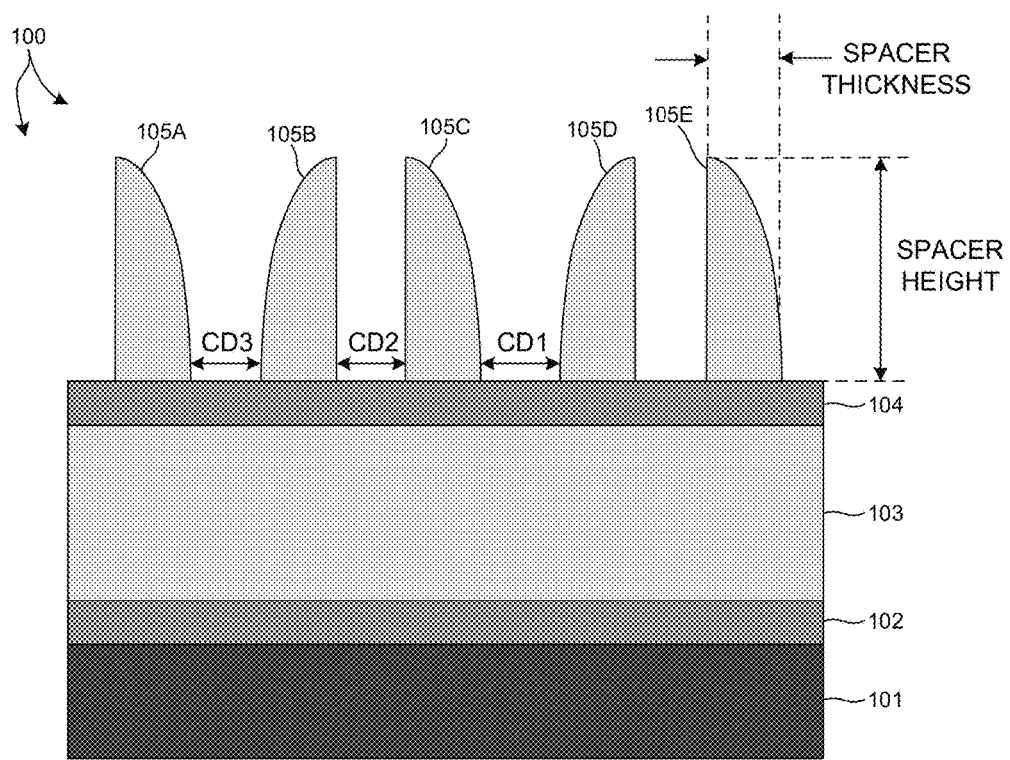
FIG. 2 depicts a semiconductor structure 100 being constructed using a self-aligned quadruple patterning (SAQP) process.

FIG. 2 depicts a semiconductor structure 100 being constructed using a self-aligned quadruple patterning (SAQP) process. FIG. 2 illustrates a process step before final etch. Semiconductor structure 100 includes a substrate layer 101, an oxide layer 102, a nitride layer 103, an oxide layer 104, and several nitride spacer structures 105A-E. Each spacer has a height and thickness. Variations in the spacing and thickness of these structures results in variations in several critical parameter values. For example, critical dimension parameters CD1, CD2, and CD3 depicted in FIG. 2 are frequently monitored because of their impact on the fin formation process, and ultimately the performance of the final structure. In addition, pitchwalk is an important parameter to both measure and control. Pitchwalk is related to CD1 and CD3 by equation $$Pitchwalk = \frac{|CD1 - CD3|}{2} \quad (1)$$

In one further aspect, the SRM measurement model is created based only on raw measurement data (e.g., simulated spectra or spectra collected from a Design of Experiments (DOE) wafer) collected from measurement sites including multiple pattern metrology targets (simulated or actual). Machine learning, feature extraction, and other techniques are employed to build a direct input-output model (i.e., transfer function) that relates DOE spectra of one or more multiple patterned targets and corresponding reference measurements of the parameter of interest. In some embodiments, the training set of multiple patterned metrology targets includes targets that are nominally the same, i.e., the targets vary from one another because of process variations. In some embodiments, the process variations that impact the parameters of interest are intentionally amplified for purposes of model training.

In one example, the transfer function relates scatterometry signals and corresponding CD-SEM measurements of SAQP target 100 depicted in FIG. 2 of CD2. An SRM model is created for each parameter of interest, and the same model is used to perform subsequent measurements on other measurement sites.

Figure 11:
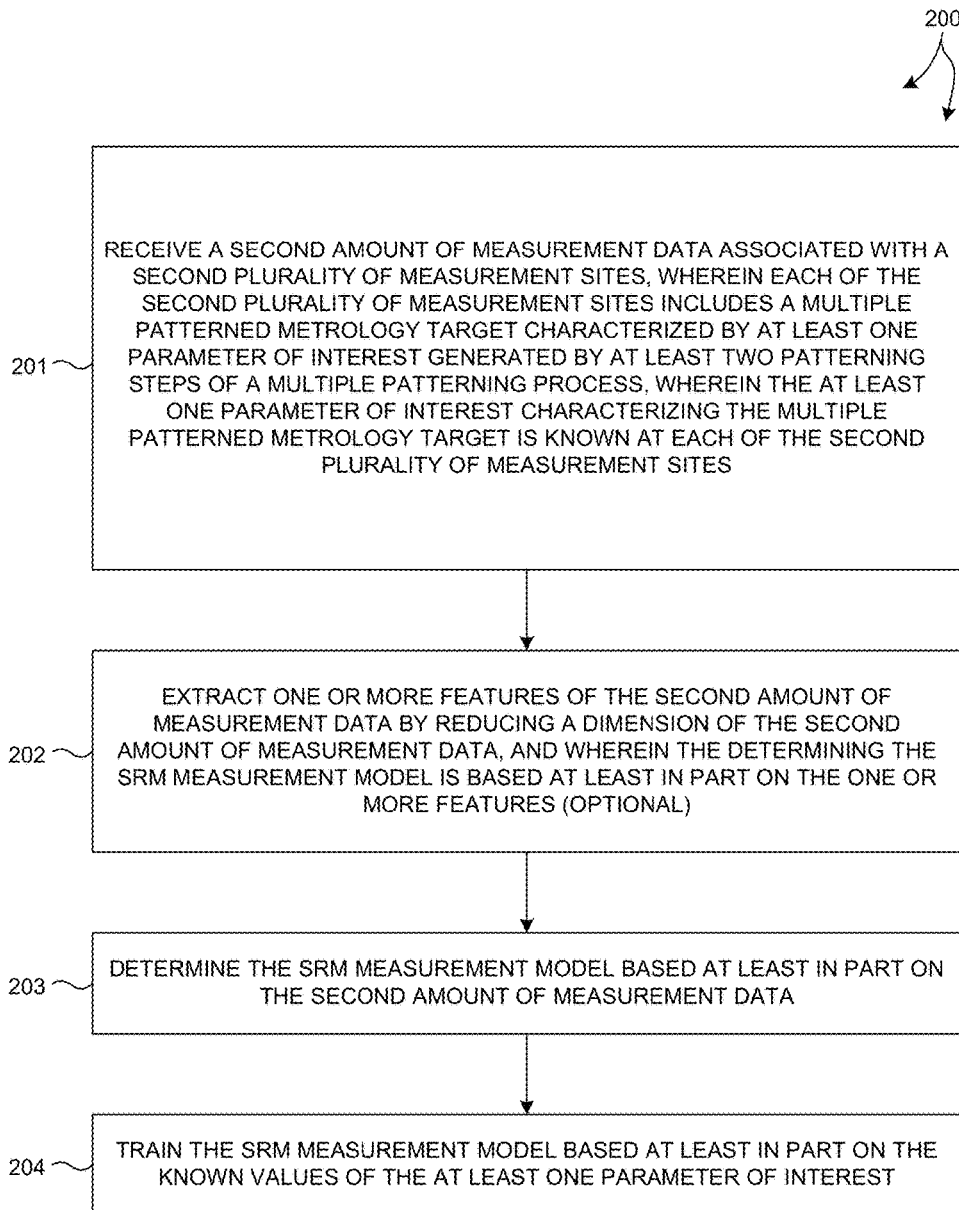
FIG. 11 is a flowchart illustrative of a method 200 of formulating and training a SRM measurement model useful to determine one or more parameter values characterizing geometric errors induced by a multiple patterning process.
Figure 13:
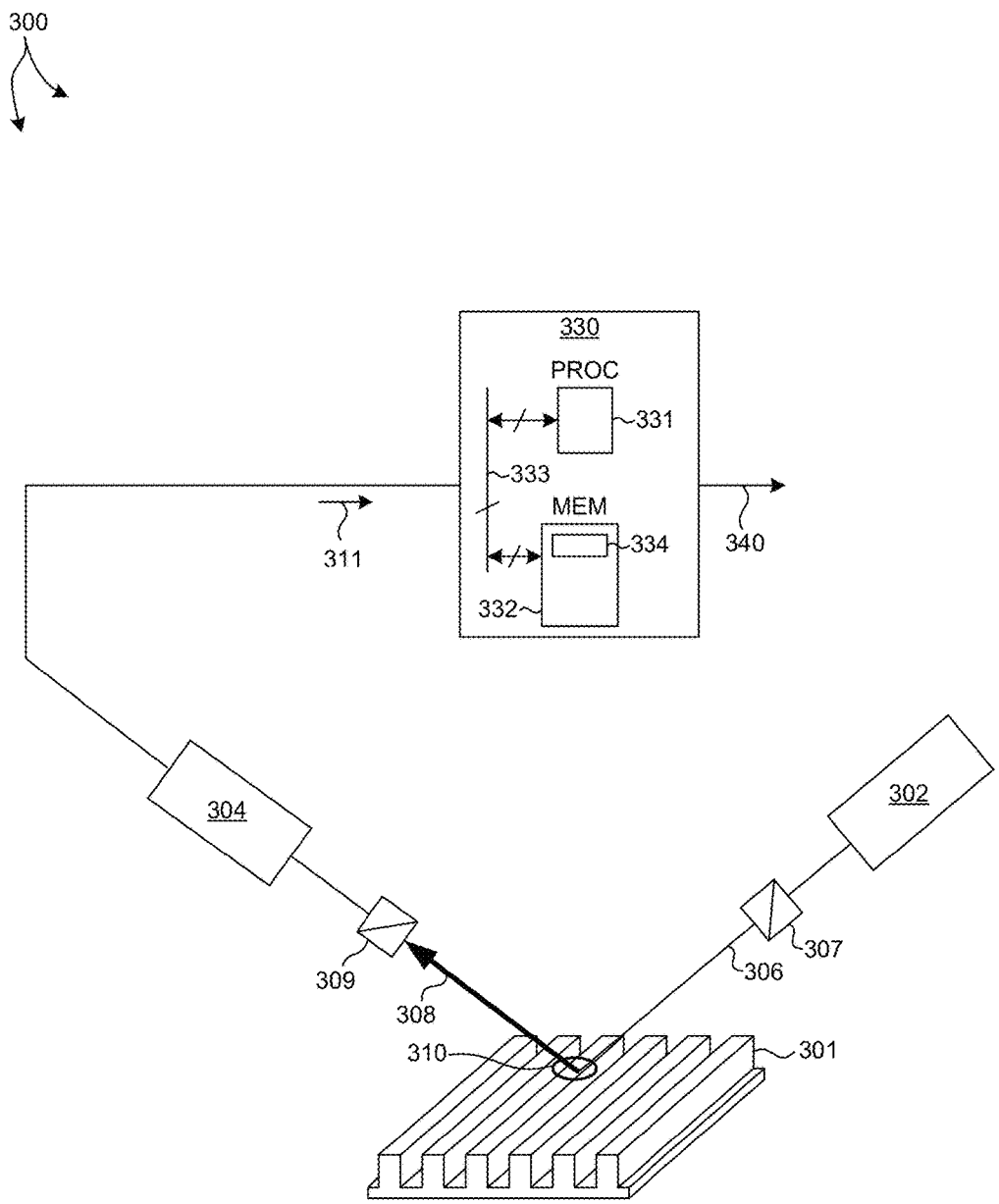
FIG. 13 illustrates a system 300 for measuring characteristics of a specimen in accordance with the exemplary methods presented herein.

FIG. 11 illustrates a method 200 suitable for implementation by a metrology system such as metrology system 300 illustrated in FIG. 13 of the present invention. In one aspect, it is recognized that data processing blocks of method 200 may be carried out via a pre-programmed algorithm executed by one or more processors of computing system 330, or any other general purpose computing system. It is recognized herein that the particular structural aspects of metrology system 300 do not represent limitations and should be interpreted as illustrative only.

In block 201, an amount of measurement data associated with measurements of a plurality of measurement sites is received by a computing system (e.g., computing system 330). Each of the plurality of measurement sites includes a multiple patterned metrology target characterized by at least one parameter of interest generated by at least two patterning steps of a multiple patterning process. A value of the parameter(s) of interest is known at each of the plurality of measurement sites.

For purposes of model training, measurement data may be acquired from any location with known perturbations in the design parameters, e.g., structure or process parameters. These locations, for example, may be in the scribe line, on-device, or may be at other locations on the wafer where, for example, lithographic exposure conditions or reticle design characteristics vary over a range of values. In another example, measurement data may be acquired from different device locations (e.g., a location with dense features and a location with isolated features, or locations with two different CDs on mask). In general, the measurement data is acquired from different locations that are perturbed in a known way. The perturbation may be known from mask data, Equipment Data Acquisition (EDA) data, process data, etc.

In one example, any of focus, exposure, and overlay are varied systematically across the device or the wafer. In another example, a randomized Focus and Exposure Matrix (FEM) is employed to reduce correlation with underlayer parameters as described in U.S. Pat. No. 8,142,966 to Izikson et al., the entirety of which is incorporated herein by reference.

In a preferred embodiment, the set of systematic variations is implemented in the fabrication of an actual DOE wafer. The DOE wafer is subsequently measured to generate the measurement data received in block 201. A manufactured wafer includes systematic errors which cannot be easily modeled by simulation. For example, the effect of underlayers is more accurately captured by measurements of a real wafer. The underlayer contribution can be decorrelated from the measurement responses by modifying process parameters during manufacture, e.g., focus and exposure variations, for a fixed underlayer condition. In another example, the underlayer contribution can be mitigated by taking multiple data sets from features with varying top layer topography and constant underlayer conditions. In one example, the top layer may include a periodic structure and the underlayer may be non-periodic.

Measurement locations may be selected to increase measurement sensitivity. In one example, measurements performed at line ends are most sensitive to changes in focus. In general, measurements should be taken at structures that are most sensitive to changes in the parameter to be measured.

Although it is preferred to perform actual measurements of DOE wafers, in some other examples the measurement response of a DOE wafer for different, known structural parameter values may be simulated. In these examples, the measurement data received in block 201 is synthetically generated. For example, a process simulator such as the Positive Resist Optical Lithography (PROLITH) simulation software available from KLA-Tencor Corporation, Milpitas, Calif. (USA) may be employed. In general, any process modeling technique or tool may be contemplated within the scope of this patent document (e.g., Coventor simulation software available from Coventor, Inc., Cary, N.C., USA).

In some examples, the measurement data includes two ellipsometric parameters ($\Psi$, $\Delta$) over a spectral range obtained at different measurement sites. However, in general, the measurement data may be any measurement data indicative of the structural or geometric properties of the structures patterned onto the surface of a semiconductor wafer.

In some examples, the measurement data is associated with simulations of measurements of the measurement sites on the surface of a DOE wafer (e.g., wafer 110). For example, the measurement data may include simulated spectral measurements associated with the multiple pattern metrology target associated with each measurement site.

In some other examples, the measurement data is associated with actual measurements of the measurement sites on the surface of a DOE wafer (e.g., wafer 110). The measurement data includes actual spectral measurements associated with the multiple pattern metrology target associated with each measurement site.

In some examples, the measurement data is associated with measurements of the plurality of measurement sites on a Design of Experiments (DOE) wafer and the parameter(s) of interest characterizing the multiple patterned metrology target is measured by a reference measurement system at each of the measurement sites. The reference metrology system is a trusted metrology system such as a Scanning Electron Microscope (SEM), Tunneling electron Microscope (TEM), Atomic Force Microscope (AFM), or an x-ray measurement system such as a Small-Angle X-Ray Scatterometer (SAXS) or an X-Ray Fluorescence (XRF) system that is able to accurately measure the parameter value. However, typically, the reference metrology system generally lacks the capability to operate as an inline metrology system, for example, due to low throughput, high measurement uncertainty for the measurement of individual sites, etc.).

Figure 3:
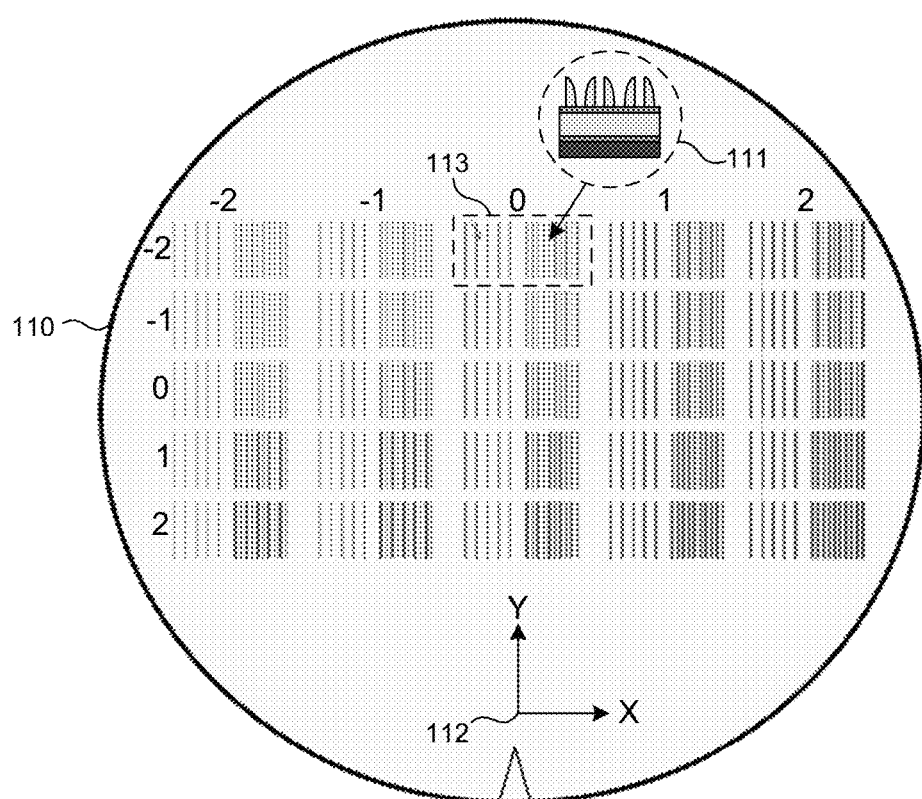
FIG. 3 depicts a semiconductor wafer 110 having a number of metrology targets located at various measurement sites over the surface of the wafer.

In some embodiments, parameter variations are organized in a Design of Experiments (DOE) pattern on the surface of a semiconductor wafer (e.g., DOE wafer), for example, as described herein with reference to FIG. 3. In this manner, the measurement system interrogates different locations on the wafer surface that correspond with different structural parameter values. In the example described with reference to FIG. 3, the measurement data is associated with a DOE wafer processed with known variations in CD1 and CD2. For example, CD1 is varied by changing dose during lithography, and CD2 is varied by changing etch time during the first etch step. CD3 is related to CD1 and CD2 by equation (2), $$CD3 = \text{LithoPitch} - 4T_{spacer} - CD_1 - 2CD_2 \qquad (2)$$

where LithoPitch is a predefined pitch of the resist grating pattern and $T_{spacer}$ is the spacer thickness. Although, in this example, dose and etch are varied to produce the desired parameter variations, in general, measurement data associated with any known variation of process parameters (e.g., lithography focus, exposure, and other local or global parameters), structural parameter, or both, may be contemplated.

FIG. 3 depicts a semiconductor wafer 110 having a number of die (e.g., die 113) located at various measurement sites over the surface of the wafer. In the embodiment depicted in FIG. 3, the die are located at measurement sites arranged in a rectangular grid pattern in alignment with the depicted x and y coordinate frame 112. Each die includes a SAQP metrology target 111). In the embodiment depicted in FIG. 3, each multiple patterned metrology target 111 includes a set of lines that result from a first patterning step along with at least one more set of interposed lines that result from a subsequent step in the multiple patterning process. As a result, each multiple patterned metrology target includes a grating structure having a repeated pattern of spacer structures such as multiple patterned unit cell 111. The geometry of multiple patterned unit cell 111 is characterized by CD1, CD2, CD3, and pitchwalk as described with reference to FIG. 2.

Wafer 110 includes an array of die having different, known structural parameter values. Thus, CD1 and CD2 have different, known values depending on their location on the wafer 110. In this manner, wafer 110 can be considered a Design of Experiments (DOE) wafer. It is desirable for the DOE wafer to include a matrix of multiple patterned metrology targets that span the full range of structural parameter values (e.g., CD1 and CD2) that are expected to arise from the underlying process window. As depicted in FIG. 3, the values of CD1 change while the values of CD2 remain constant for different columns of die (columns index in the x-direction). Conversely, the values of CD1 remain constant while the values of CD2 change for different rows of die (rows index in the y-direction). In this manner, wafer 110 includes a matrix of die that include different values of CD1 and CD2 depending on their location in the matrix. Moreover, the values of CD1 and CD2 range over the values of CD1 and CD2 that are expected to arise from the process window.

In block 202, one or more features of the measurement data is extracted by reducing a dimension of the measurement data. Although, this block is optional, when it is employed, the SRM measurement model is determined based at least in part on the one or more extracted features.

In general, the dimension of the measurement data may be reduced by a number of known methods, including a principal components analysis, a non-linear principal components analysis, a selection of individual signals from the second amount of measurement data, and a filtering of the second amount of measurement data.

In some examples, the measurement data is analyzed using Principal Components Analysis (PCA), non-linear PCA, kernel PCA, Independent Component Analysis (ICA), Fast Fourier Transform analysis (FFT), Discrete Cosine Transform analysis (DCT), or a combination of these techniques to extract features that most strongly reflect the variations in process parameter, structural parameters, or both, that are present at the different measurement sites. In some other examples, a signal filtering technique may be applied to extract signal data that most strongly reflects the parameter variations present at the different measurement sites. In some other examples, individual signals that most strongly reflect the parameter variations present at the different measurement sites may be selected from multiple signals present in the measurement data. Although, it is preferred to extract features from the measurement data to reduce the dimension of data subject to subsequent analysis, it is not strictly necessary. In this sense, block 202 is optional.

In block 203, the SRM measurement model is determined based at least in part on the measurement data.

An SRM measurement model is determined based on features extracted from the measurement data, or alternatively, directly from the measurement data. A trained SRM measurement model is structured to receive measurement data generated by a metrology system at one or more measurement sites, and directly determine structural parameter values associated with each measurement target. In a preferred embodiment, the SRM measurement model is implemented as a neural network model. In one example, the number of nodes of the neural network is selected based on the features extracted from the measurement data. In other examples, the SRM measurement model may be implemented as a linear model, a polynomial model, a response surface model, a decision tree model, a random forest model, a support vector machine model or other types of models.

In block 204, the SRM measurement model is trained based on the known values of the parameter of interest. In some examples, the trained SRM measurement model is generated using DOE measurement data and known parameter values. The model is trained such that its output fits the defined expected response for all the spectra in the process variation space defined by the DOE spectra.

In some examples, the trained SRM model is used to calculate structure parameter values directly from measured data (e.g., spectra) collected from actual device structures of other wafers (e.g., product wafers) as described herein with reference to method 250. In this manner, only spectra acquired from known samples or synthetically generated spectra is required to create a measurement model and to perform measurements using the model. A SRM measurement model formulated in this manner receives measurement data (e.g., measured spectra) directly as input and provides parameter values as output, and is thus, a trained input-output model.

Additional details related to model generation, training, and utilization as part of the measurement process are described in U.S. Pat. No. 8,843,875 to Pandev, U.S. Patent Publication No. 2014/0297211 by Pandev et al., U.S. Patent Publication No. 2014/0316730 by Shchegrov et al., U.S. Patent Publication No. 2014/0172394, U.S. Patent Publication No. 2014/0297211 by Pandev et al., U.S. Patent Publication No. 2015/0042984 by Pandev et al., U.S. Patent Publication No. 2015/0046118 by Pandev et al., U.S. patent application Ser. No. 14/624,485 by Pandev, and U.S. Provisional Patent Application No. 61/991,857, the entirety of each are incorporated herein by reference.

Figure 12:
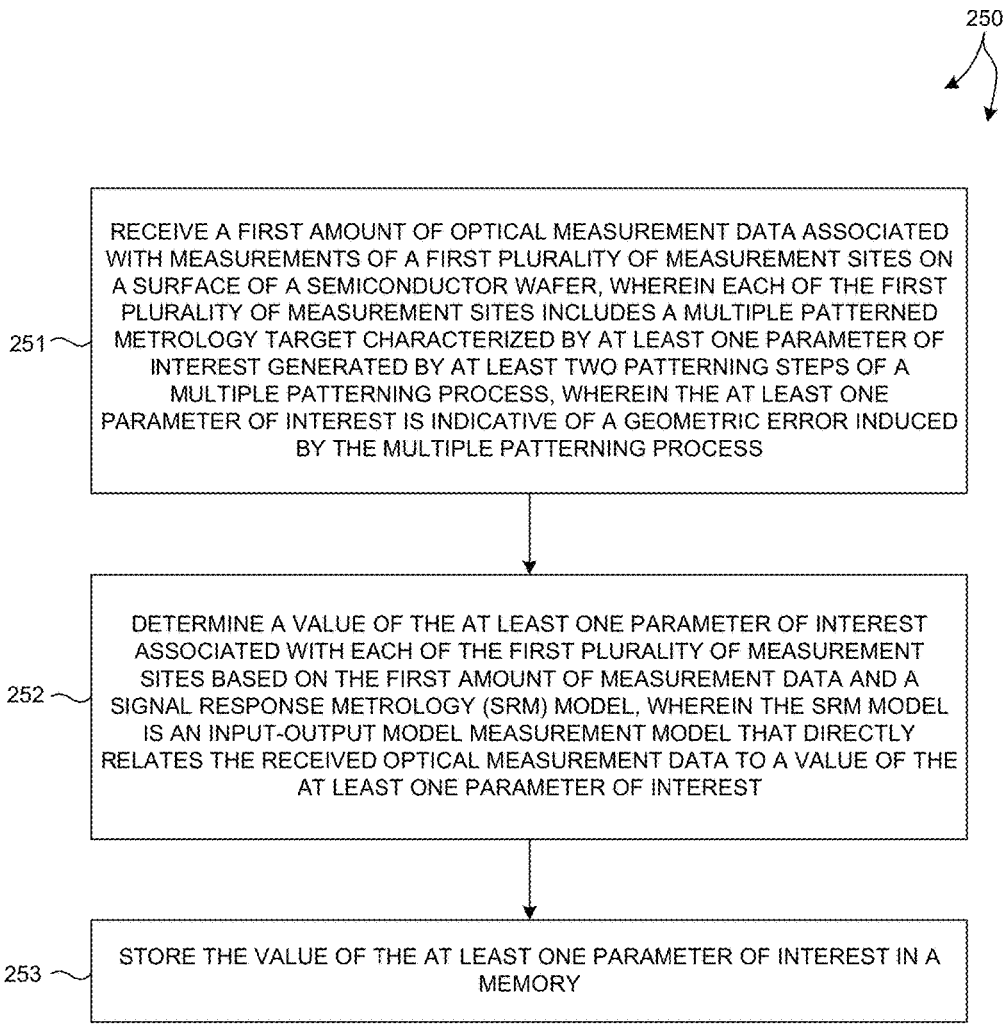
FIG. 12 is a flowchart illustrative of a method 250 of determining one or more parameter values characterizing geometric errors induced by a multiple patterning process.

FIG. 12 illustrates a method 250 suitable for implementation by a metrology system such as metrology system 300 illustrated in FIG. 13 of the present invention. In one aspect, it is recognized that data processing blocks of method 250 may be carried out via a pre-programmed algorithm executed by one or more processors of computing system 330, or any other general purpose computing system. It is recognized herein that the particular structural aspects of metrology system 300 do not represent limitations and should be interpreted as illustrative only.

In block 251, an amount of optical measurement data associated with measurements of a plurality of measurement sites on a surface of a semiconductor wafer is received by a computing system (e.g., computing system 330). Each of the plurality of measurement sites includes a multiple patterned metrology target characterized by at least one parameter of interest generated by at least two patterning steps of a multiple patterning process. The parameter(s) of interest is indicative of a geometric error induced by the multiple patterning process.

In one example, structural parameters CD1, CD2, CD3, and pitchwalk of target structure 100 depicted in FIG. 2 are parameters of interest. These parameters are provided by way of non-limiting example. In general, many other structural parameters (e.g., sidewall angle, bottom critical dimension, etc.) may be employed to indicate geometric errors induced by a multiple patterning process.

In some embodiments, a product wafer under measurement includes an array of nominally valued structures. Thus, CD1, CD2, CD3, and pitchwalk have the same nominal values regardless of location on the wafer.

In some examples, the measurement data includes two ellipsometric parameters ($\Psi$, $\Delta$) over a spectral range obtained at different measurement sites. The measurement data includes spectral measurements associated with the multiple patterned metrology target associated with each measurement site. Although, in some examples, the measurement data is spectral measurement data, in general, the measurement data may be any measurement data indicative of the structural or geometric properties of the structures patterned onto the surface of a semiconductor wafer.

In block 252, the value of at least one parameter of interest associated with each of the plurality of measurement sites is determined based on the measurement data and a trained SRM measurement model. The value of the parameter of interest is indicative of a geometric error induced by the multiple patterning process. The value of the parameter of interest is calculated directly from the trained SRM measurement model.

In block 103, the value of the parameter of interest is stored in a memory (e.g., memory 332).

Figure 4:
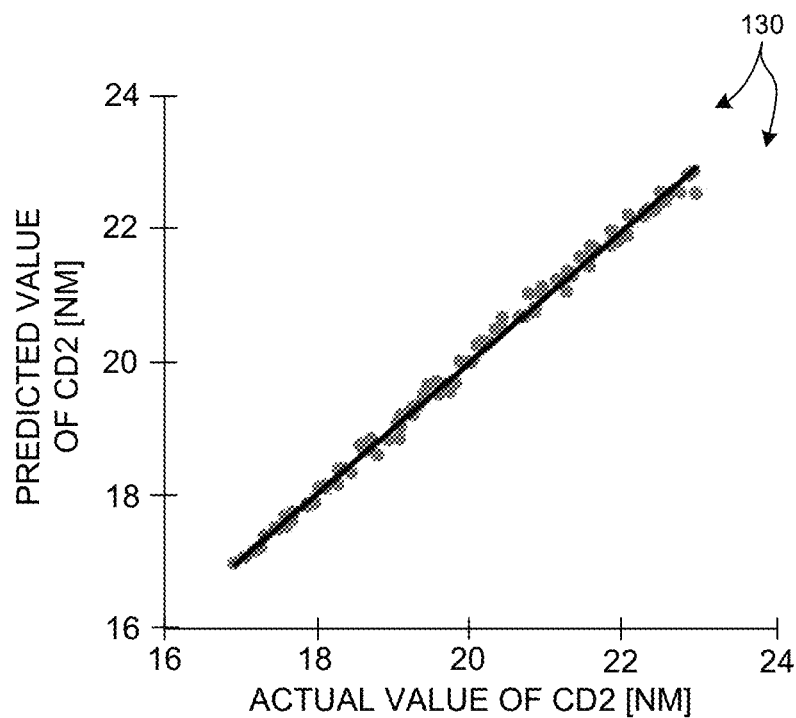
FIG. 4 illustrates a plot 130 demonstrating the results of measuring CD2 directly from measured spectra using an SRM model trained in accordance with method 200 described herein.

FIG. 4 illustrates a plot 130 demonstrating the results of measuring CD2 directly from measured spectra using an SRM model trained in accordance with method 200 described herein. In this example, DOE spectra were generated synthetically for different values of CD2 in the presence of variations of other geometric parameter values. In this example, the nominal value of CD2 varied over a range of five nanometers. FIG. 4 illustrates a plot of the value of CD2 predicted by the SRM measurement model for given measurement spectra versus the actual CD2 value used to generate the synthetic spectra. As depicted in FIG. 4, the fit between predicted and actual values of CD2 is quite close.

Figure 5:
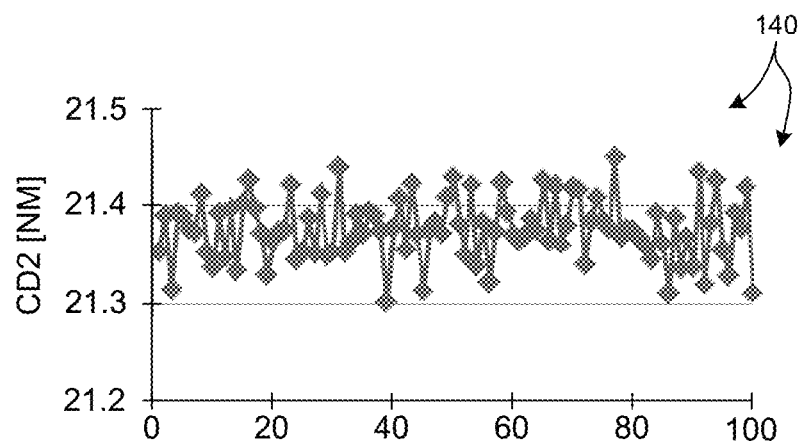
FIG. 5 illustrates a plot 140 demonstrating the variations in the measurements of CD2 using the trained SRM model.

FIG. 5 illustrates a plot 140 demonstrating the variations in the measurements of CD2 using the trained SRM model. In this example, DOE spectra were generated synthetically for the same value of CD2 in the presence of variations of other geometric parameter values. An estimate of the value of CD2 was made by the trained SRM model for each set of DOE spectra. FIG. 5 illustrates a plot of the values of CD2 predicted by the SRM measurement model for each DOE spectra. As depicted in FIG. 5, CD2 is measured with a precision of approximately 0.1 nanometers.

Figure 6:
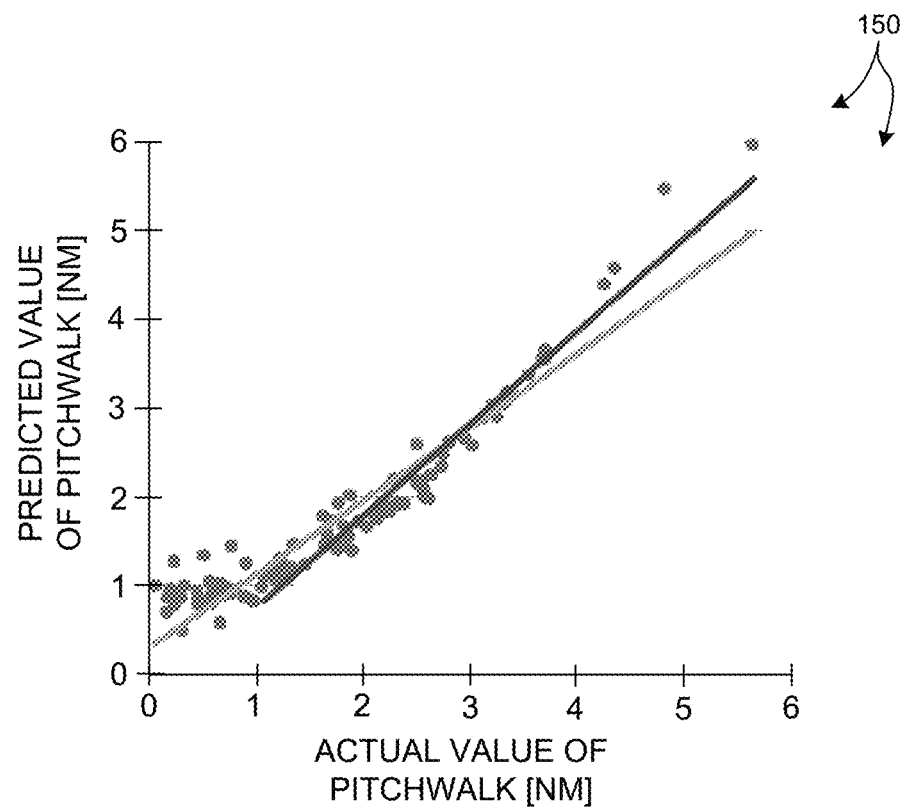
FIG. 6 illustrates a plot 150 demonstrating the results of measuring pitchwalk directly from measured spectra using an SRM model trained in accordance with method 200 described herein.

FIG. 6 illustrates a plot 150 demonstrating the results of measuring pitchwalk directly from measured spectra using an SRM model trained in accordance with method 200 described herein. In this example, the same measurement spectra associated with CD2 of target 100 are used to estimate pitchwalk. FIG. 6 illustrates a plot of the value of pitchwalk predicted by the SRM measurement model for given measurement spectra versus the actual pitchwalk value used to generate the synthetic spectra. As depicted in FIG. 6, the fit between predicted and actual values of pitchwalk is quite close.

Figure 7:
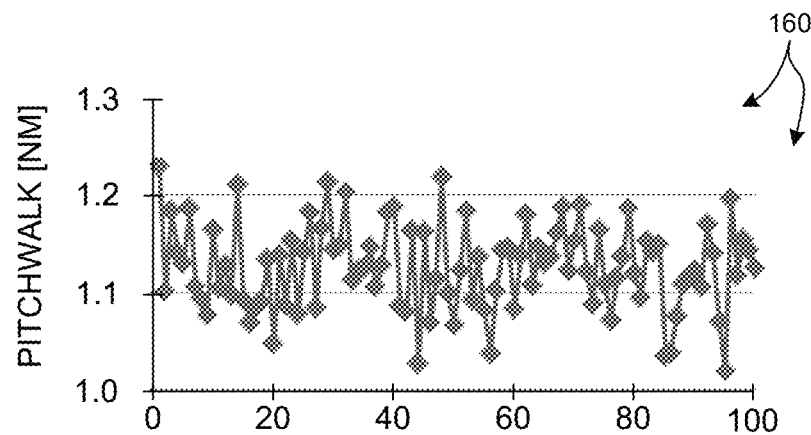
FIG. 7 illustrates a plot 160 demonstrating the variations in the measurements of pitchwalk using the trained SRM model.

FIG. 7 illustrates a plot 160 demonstrating the variations in the measurements of pitchwalk using the trained SRM model. An estimate of the value of pitchwalk was made by the trained SRM model for each set of DOE spectra. FIG. 7 illustrates a plot of the values of pitchwalk predicted by the SRM measurement model for each DOE spectra. As depicted in FIG. 7, pitchwalk is measured with a variation of approximately 1.3 nanometers.

Due to structural symmetry present in target 100, CD1 cannot be directly measured from scatterometry signal derived from target 100 alone. The scatterometry signals from a grating structure having a positive valued perturbation in CD1 (e.g., CD1+x) are identical to the scatterometry signals from a grating structure having a negative valued perturbation in CD1 (e.g., CD1−x).

In one further aspect, a SRM measurement model is trained on measurement signals from multiple targets integrated into one multi-target set and operates on measurement signals from the same multiple targets. This approach de-correlates critical parameters from each other and from other process variations.

In some embodiments, assist targets are located next to the primary measurement target and are subject to the same process variations (e.g., SAQP process variations). In these embodiments, the training set of metrology targets includes a primary, nominally dimensioned target and one or more assist targets that have different nominal values of the parameters of interest The assist targets are formed during the lithography process steps. In some examples, a mask with different line to space ratio and/or different pitch can be used to create assist targets. It is preferable to locate the primary and assist targets as close together as possible to enhance the accuracy of the SRM measurement model. In some embodiments, both primary and assist metrology targets are located adjacent to one another at each measurement site. By locating the metrology targets close together, simplifying assumptions used to link parameters of both metrology targets are less likely to induce significant errors. For example, the thickness of an underlying layer is very likely to be the same value for both metrology targets as long as the targets are located in close proximity. Thus, for adjacent metrology targets, the thickness of the underlying layer can be treated as the same constant value without inducing significant error.

The use of assist targets to train and use a SRM measurement model is analogous to the single target approach described hereinbefore. However, in addition the training of the multi-target SRM measurement model requires training data from the assist targets and the primary metrology target. Similarly, the use of the multi-target SRM measurement model requires measurement data from the assist targets and the primary measurement target. It is noted however, that reference measurement data for training need only be collected from the primary target as the specific parameter values associated with the assist targets is not of interest.

Figure 8:
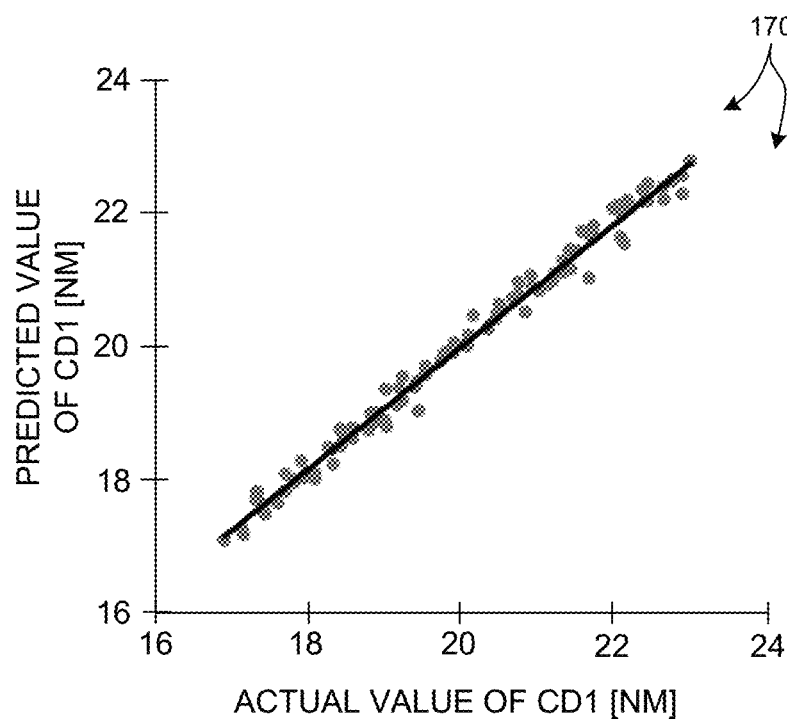
FIG. 8 illustrates a plot 170 demonstrating the results of measuring CD1 directly from measured spectra of assist targets and primary target 100 using an SRM model trained in accordance with method 200 described herein.
Figure 9:
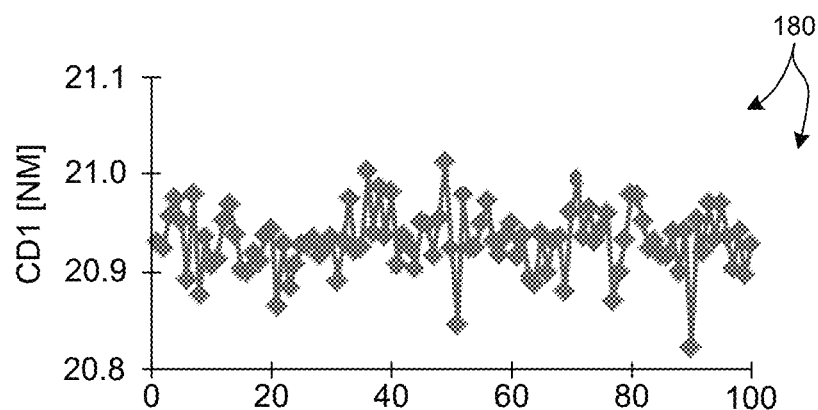
FIG. 9 illustrates a plot 180 demonstrating the variations in the measurements of CD1 using the trained SRM model.

FIGS. 8-9 demonstrate results for the measurement of CD1 achieved with primary metrology target 100 and two assist targets. In this example, the assist targets are the same as the primary metrology target except that they differ from one another by the resist width of the grating pattern. In this example, the difference in resist width of one assist target results in a CD1 value associated with the assist target that is 2 nanometers larger than the CD1 value of the primary target. In addition, the difference in resist width of the other assist target results in a CD1 value associated with the assist target that is 2 nanometers smaller than the CD1 value of the primary target.

FIG. 8 illustrates a plot 170 demonstrating the results of measuring CD1 directly from measured spectra of assist targets and primary target 100 using an SRM model trained in accordance with method 200 described herein. In this example, DOE spectra were generated synthetically for different values of CD1 in the presence of variations of other geometric parameter values. In this example, the nominal value of CD1 varied over a range of five nanometers. FIG. 8 illustrates a plot of the value of CD1 predicted by the SRM measurement model for given measurement spectra versus the actual CD1 value used to generate the synthetic spectra. As depicted in FIG. 8, the fit between predicted and actual values of CD1 is quite close.

FIG. 9 illustrates a plot 180 demonstrating the variations the measurements of CD1 using the trained SRM model. In this example, DOE spectra were generated synthetically for the same value of CD1 in the presence of variations of other geometric parameter values. An estimate of the value of CD1 was made by the trained SRM model for each set of DOE spectra. FIG. 9 illustrates a plot of the values of CD1 predicted by the SRM measurement model for each DOE spectra. As depicted in FIG. 9, CD1 is measured with a precision of approximately 0.1 nanometers.

In another further aspect, a SRM measurement model is trained and used based on measurement signals from a metrology target at multiple steps of the multiple patterning process. Measured spectra from one or more previous process steps are fed forward for training and use of the SRM measurement model associated with the primary target. This approach also de-correlates critical parameters from each other and from other process variations.

This approach does not require the extra wafer space needed to implement additional assist targets. However, this approach does require that wafer measurements be performed a multiple process steps.

The use of measurement data collected at multiple process steps to train and use a SRM measurement model is analogous to the single target approach described hereinbefore. However, in addition, the training of the SRM measurement model requires measurement of the primary target at a minimum of two different process steps. Similarly, the use of the SRM measurement model requires measurement data from the primary target at the different process steps. It is noted, however, that reference measurement data for training need only be collected from the primary target at the latest process step as only the specific parameter values of the target at this step are of interest.

Figure 10A:
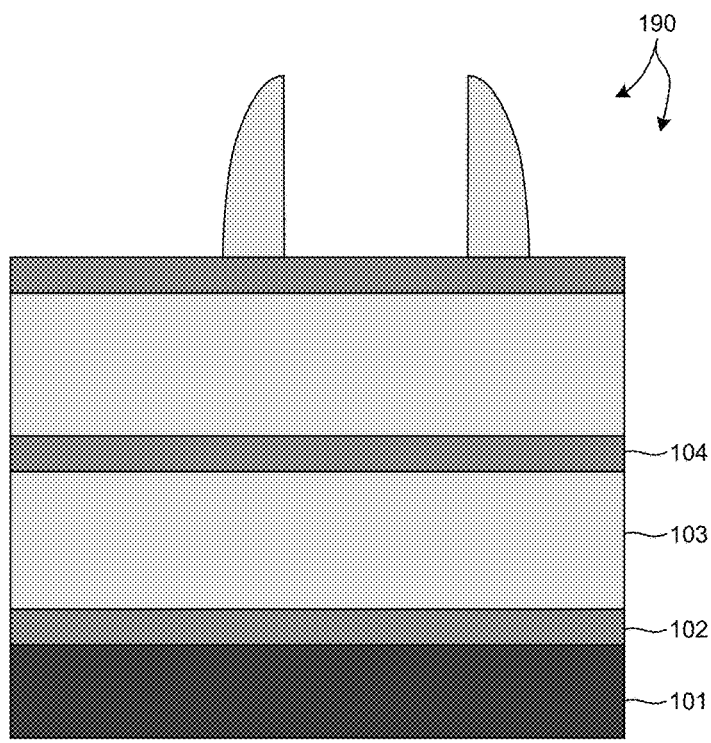
FIG. 10A depicts a model of a step in a SADP process prior to the "before final etch" step depicted in FIG. 2.

FIG. 10A depicts a model of a step in the SADP process prior to the "before final etch" step depicted in FIG. 2. Measurement data at this step contains information about CD1 and CD2, but has no information about CD3 because final gratings have yet to be formed. However, at this step, the value of CD1-CD3 is already fixed and will not change during the rest of the process steps due to process symmetry.

Figure 10B:
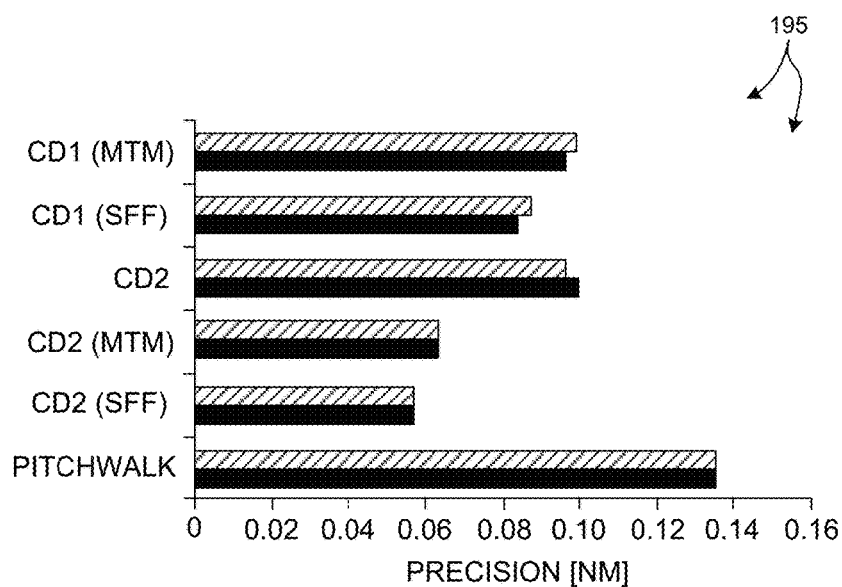
FIG. 10B depicts a chart 195 of measurement results for different parameters using different measurement techniques based on two different reference measurement data sets.

FIG. 10B demonstrates the precision of measurement results for CD1 and CD2 applying spectral feedforward as described herein, (labeled "CD1 (SFF)" and "CD2 (SFF)", respectively).

As described herein, reference measurements obtained using other technologies are required to train the SRM model. CD-SEM is an exemplary measurement technique that is known for its high measurement uncertainty. FIG. 8 demonstrates that the measurement techniques described herein are robust to reference measurement uncertainty as the reference measurement errors are averaged away for typical training data sets.

FIG. 10B depicts a chart 195 of measurement results for different parameters (i.e., CD1, CD2, and pitchwalk) using different measurement techniques (i.e., single target, multi-target model (MTM) and spectra feedforward (SFF)) based on two different reference measurement data sets. The first set employs synthetic reference measurement training data without noise. The results are illustrated with a solid pattern in FIG. 10B. The second set employs synthetic reference measurement training data including measurement noise of 0.25 nanometers, three-sigma. The results are illustrated with a hatched pattern in FIG. 10B. As depicted in FIG. 10B, the addition of measurement noise has no appreciable effect on the precision of the resulting measurements.

Although the use of multiple targets and spectra feedforward to enhance SRM model training and use are described separately, both techniques can be used in combination. In one example, an SRM model is trained and applied to perform measurements using spectra from assist targets and spectra from previous patterning steps. In this manner, both the training spectra and measurement spectra are combinations of spectra of different targets formed by the same process conditions and at different steps of the process.

Specific examples involving SADP are described herein by way of non-limiting example. In general the methods and systems described herein may be employed to improve measurement of parameters of interest generated by any multiple patterning technique (e.g., self-aligned double, triple, quadruple, octuple patterning, double litho, double etch (LELE) patterning, etc.).

FIG. 13 illustrates a system 300 for measuring characteristics of a specimen in accordance with the exemplary methods presented herein. As shown in FIG. 13, the system 300 may be used to perform spectroscopic ellipsometry measurements of one or more structures of a specimen 301. In this aspect, the system 300 may include a spectroscopic ellipsometer equipped with an illuminator 302 and a spectrometer 304. The illuminator 302 of the system 300 is configured to generate and direct illumination of a selected wavelength range (e.g., 150-2000 nm) to the structure disposed on the surface of the specimen 301. In turn, the spectrometer 304 is configured to receive illumination reflected from the surface of the specimen 301. It is further noted that the light emerging from the illuminator 302 is polarized using a polarization state generator 307 to produce a polarized illumination beam 306. The radiation reflected by the structure disposed on the specimen 301 is passed through a polarization state analyzer 309 and to the spectrometer 304. The radiation received by the spectrometer 304 in the collection beam 308 is analyzed with regard to polarization state, allowing for spectral analysis by the spectrometer of radiation passed by the analyzer. These spectra 311 are passed to the computing system 330 for analysis of the structure.

As depicted in FIG. 13, system 300 includes a single measurement technology (i.e., SE). However, in general, system 300 may include any number of different measurement technologies. By way of non-limiting example, system 300 may be configured as a spectroscopic ellipsometer (including Mueller matrix ellipsometry), a spectroscopic reflectometer, a spectroscopic scatterometer, an overlay scatterometer, an angular resolved beam profile reflectometer, a polarization resolved beam profile reflectometer, a beam profile reflectometer, a beam profile ellipsometer, any single or multiple wavelength ellipsometer, or any combination thereof. Furthermore, in general, measurement data collected by different measurement technologies and analyzed in accordance with the methods described herein may be collected from multiple tools, rather than one tool integrating multiple technologies.

In a further embodiment, system 300 may include one or more computing systems 330 employed to perform measurements based on measurement models developed in accordance with the methods described herein. The one or more computing systems 330 may be communicatively coupled to the spectrometer 304. In one aspect, the one or more computing systems 330 are configured to receive measurement data 311 associated with measurements of the structure of specimen 301.

It should be recognized that the various steps described throughout the present disclosure may be carried out by a single computer system 330 or, alternatively, a multiple computer system 330. Moreover, different subsystems of the system 300, such as the spectroscopic ellipsometer 304, may include a computer system suitable for carrying out at least a portion of the steps described herein. Therefore, the aforementioned description should not be interpreted as a limitation on the present invention but merely an illustration. Further, the one or more computing systems 330 may be configured to perform any other step(s) of any of the method embodiments described herein.

In addition, the computer system 330 may be communicatively coupled to the spectrometer 304 in any manner known in the art. For example, the one or more computing systems 330 may be coupled to computing systems associated with the spectrometer 304. In another example, the spectrometer 304 may be controlled directly by a single computer system coupled to computer system 330.

The computer system 330 of the metrology system 300 may be configured to receive and/or acquire data or information from the subsystems of the system (e.g., spectrometer 304 and the like) by a transmission medium that may include wireline and/or wireless portions. In this manner, the transmission medium may serve as a data link between the computer system 330 and other subsystems of the system 300.

Computer system 330 of the integrated metrology system 300 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 330 and other systems (e.g., memory on-board metrology system 300, external memory, reference measurement source 320, or other external systems). For example, the computing system 330 may be configured to receive measurement data from a storage medium (i.e., memory 332 or an external memory) via a data link. For instance, spectral results obtained using spectrometer 304 may be stored in a permanent or semi-permanent memory device (e.g., memory 332 or an external memory). In this regard, the spectral results may be imported from on-board memory or from an external memory system. Moreover, the computer system 330 may send data to other systems via a transmission medium. For instance, a combined measurement model or a structural parameter value 340 determined by computer system 330 may be communicated and stored in an external memory. In this regard, measurement results may be exported to another system.

Computing system 330 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 334 implementing methods such as those described herein may be transmitted over a transmission medium such as a wire, cable, or wireless transmission link. For example, as illustrated in FIG. 13, program instructions 334 stored in memory 332 are transmitted to processor 331 over bus 333. Program instructions 334 are stored in a computer readable medium (e.g., memory 332). Exemplary computer-readable media include read-only memory, a random access memory, a magnetic or optical disk, or a magnetic tape.

In some embodiments, the illumination light and light collected from the illuminated measurement site includes multiple, different wavelengths. In some embodiments, the light is collected from the illuminated measurement site at multiple, different collection angles. By detecting light at multiple wavelengths and angles of collection, measurement sensitivity to pitch walk and variation in critical dimensions (e.g., CD) is improved. In some embodiments, the light is collected from the illuminated measurement site at multiple, different azimuthal angles. These out-of-plane measurements may also improve measurement sensitivity to pitch walk and variations in critical dimensions. In some embodiments, the collection of optical measurement data is optimized for a particular set of system settings, e.g., spectroscopic or angular resolved system, one or more azimuth angles one or more wavelengths, and any combination thereof.

In some examples, the use of measurement data associated with multiple targets for model building, training, and measurement eliminates, or significantly reduces, the effect of under layers in the measurement result. In one example, measurement signals from two targets are subtracted to eliminate, or significantly reduce, the effect of under layers in each measurement result. The use of measurement data associated with multiple targets increases the sample and process information embedded in the model. In particular, the use of training data that includes measurements of multiple, different targets at one or more measurement sites enables more accurate measurements.

In one example, a measurement model is created from spectral measurements of a DOE wafer for both isolated and dense targets. The measurement model is then trained based on the spectral measurement data and known structural parameter values. The resulting trained measurement models are subsequently employed to calculate structural parameter values for both isolated and dense targets on sample wafers. In this manner, each parameter has its own trained model that calculates the parameter value from the measured spectra (or extracted features) associated with both isolated and dense targets.

In another further aspect, measurement data derived from measurements performed by a combination of multiple, different measurement techniques is collected for model building, training, and measurement. The use of measurement data associated with multiple, different measurement techniques increases the sample and process information embedded in the model and enables more accurate measurements. Measurement data may be derived from measurements performed by any combination of multiple, different measurement techniques. In this manner, different measurement sites may be measured by multiple, different measurement techniques to enhance the measurement information available for characterization of the semiconductor structures.

In general, any measurement technique, or combination of two or more measurement techniques may be contemplated within the scope of this patent document. Exemplary measurement techniques include, but are not limited to spectroscopic ellipsometry, including Mueller matrix ellipsometry, spectroscopic reflectometry, spectroscopic scatterometry, scatterometry overlay, beam profile reflectometry, both angle-resolved and polarization-resolved, beam profile ellipsometry, single or multiple discrete wavelength ellipsometry, transmission small angle x-ray scatterometer (TSAXS), small angle x-ray scattering (SAXS), grazing incidence small angle x-ray scattering (GISAXS), wide angle x-ray scattering (WAXS), x-ray reflectivity (XRR), x-ray diffraction (XRD), grazing incidence x-ray diffraction (GIXRD), high resolution x-ray diffraction (HRXRD), x-ray photoelectron spectroscopy (XPS), x-ray fluorescence (XRF), grazing incidence x-ray fluorescence (GIXRF), low-energy electron induced x-ray emission scatterometry (LEXES), x-ray tomography, and x-ray ellipsometry. In general, any metrology technique applicable to the characterization of semiconductor structures, including image based metrology techniques, may be contemplated. Additional sensor options include electrical sensors such as non-contact capacitance/voltage or current/voltage sensors which bias the device and detect the resulting bias with an optical sensor (or the converse), or assisted optical techniques, such as XRD, XRF, XPS, LEXES, SAXS, and pump probe techniques. In one embodiment a two-dimensional beam profile reflectometer (pupil imager) may be used to collect both angle resolved and/or multi-spectral data in a small spot size. A UV Linnik interferometer may also be used as a Mueller matrix spectral pupil imager.

In some examples, the model building, training, and measurement methods described herein are implemented as an element of a SpectraShape® optical critical-dimension metrology system available from KLA-Tencor Corporation, Milpitas, Calif., USA. In this manner, the model is created and ready for use immediately after the DOE wafer spectra are collected by the system.

In some other examples, the model building and training methods described herein are implemented off-line, for example, by a computing system implementing AcuShape® software available from KLA-Tencor Corporation, Milpitas, Calif., USA. The resulting, trained model may be incorporated as an element of an AcuShape® library that is accessible by a metrology system performing measurements.

In another example, the methods and systems described herein may be applied to overlay metrology. Grating measurements are particularly relevant to the measurement of overlay. The objective of overlay metrology is to determine shifts between different lithographic exposure steps. Performing overlay metrology on-device is difficult due to the small size of on-device structures, and the typically small overlay value.

For example, the pitch of typical scribe line overlay metrology structures varies from 200 nanometers to 2,000 nanometers. But, the pitch of on-device, overlay metrology structures is typically 100 nanometers or less. In addition, in a nominal production environment, the device overlay is only a small fraction of the periodicity of the device structure. In contrast, proxy metrology structures used in scatterometry overlay are frequently offset at larger values, e.g., quarter of the pitch, to enhance signal sensitivity to overlay.

Under these conditions, overlay metrology is performed with sensor architectures having sufficient sensitivity to small offset, small pitch overlay. The methods and systems described herein may be employed to obtain a measurement signal sensitive to overlay based on on-device structures, proxy structures, or both.

After acquisition, the measured signals are analyzed to determine overlay error based on variations in the measured signals. In one further aspect, the spectral or angle-resolved data is analyzed using PCA, and an overlay model is trained to determine overlay based on the principal components detected in the measured signal. In one example, the overlay model is a neural network model. In this sense, the overlay model is not a parametric model, and thus is not prone to errors introduced by inaccurate modeling assumptions.

In some embodiments, the training of the overlay metrology model is based on measurements of dedicated metrology structures which are nominally identical to the device features but with larger offsets. This can help to overcome the sensitivity problem. These offsets can be introduced by fixed design offsets introduced between features in the two layers to be measured during reticle design. The offsets can also be introduced by shifts in the lithography exposure. The overlay error may be extracted more efficiently from the compressed signal (e.g., PCA signal) by using multiple, shifted targets (e.g., pitch/4 and −pitch/4) and the effect of the underlayer may also be reduced.

In general, the methods and systems for performing semiconductor metrology presented herein may be applied directly to actual device structures or to dedicated metrology targets (e.g., proxy structures) located in-die or within scribe lines.

In yet another aspect, the measurement techniques described herein can be used to provide active feedback to a process tool (e.g., lithography tool, etch tool, deposition tool, etc.). For example, values of the structural parameters determined using the methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively.

In general, the systems and methods described herein can be implemented as part of a dedicated metrology tool, or alternatively implemented as part of a process tool (e.g., lithography tool, etch tool, etc.).

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology system 300 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
providing a first amount of illumination light to a first plurality of measurement sites on a semiconductor wafer, wherein each of the first plurality of measurement sites includes at least one multiple patterned metrology target characterized by at least one parameter of interest generated by at least two patterning steps of a multiple patterning process, wherein a pitch of the at least one multiple patterned target fabricated by the multiple patterning process is a multiple of a pitch of a mask of a lithography system employed as part of the multiple patterning process, wherein the at least one parameter of interest is indicative of a geometric error that results from the multiple patterning process, wherein at least one of the multiple patterned metrology targets located at one or more of the first plurality of measurement sites is different from at least one of another of the multiple patterned metrology targets;
detecting an amount of light from each of the first plurality of measurement sites in response to the first amount of illumination light provided to each of the first plurality of measurement sites on the semiconductor wafer, the detected amount of light comprising a first amount of optical measurement data;
receiving the first amount of optical measurement data associated with the measurements of the first plurality of measurement sites on the semiconductor wafer;
determining a value of the at least one parameter of interest associated with each of the first plurality of measurement sites based on the first amount of measurement data and a signal response metrology (SRM) model, wherein the SRM model is an input-output model measurement model that directly relates the received optical measurement data to a value of the at least one parameter of interest; and
storing the value of the at least one parameter of interest in a memory.

2. The method of claim 1, further comprising:
receiving a second amount of measurement data associated with a second plurality of measurement sites, wherein each of the second plurality of measurement sites includes a multiple patterned metrology target characterized by at least one parameter of interest generated by at least two patterning steps of a multiple patterning process, wherein the at least one parameter of interest characterizing the multiple patterned metrology target is known at each of the second plurality of measurement sites;
determining the SRM measurement model based at least in part on the second amount of measurement data; and
training the SRM measurement model based at least in part on the known values of the at least one parameter of interest.

3. The method of claim 2, wherein the second amount of measurement data is associated with measurements of the second plurality of measurement sites on a Design of Experiments (DOE) wafer and the at least one parameter of interest characterizing the multiple patterned metrology target is measured by a reference measurement system at each of the second plurality of measurement sites.

4. The method of claim 2, wherein the second amount of measurement data and the at least one parameter of interest characterizing the multiple patterned metrology target at each of the second plurality of measurement sites are simulated.

5. The method of claim 2, further comprising:
extracting one or more features of the second amount of measurement data by reducing a dimension of the second amount of measurement data, and wherein the determining the SRM measurement model is based at least in part on the one or more features.

6. The method of claim 5, wherein the reducing the dimension of the second amount of measurement data involves any of a principal components analysis, a non-linear principal components analysis, a selection of individual signals from the second amount of measurement data, and a filtering of the second amount of measurement data.

7. The method of claim 1, wherein the SRM measurement model is a multi-target model.

8. The method of claim 7, wherein the first amount of measurement data includes measurements of a nominal metrology target and at least one assist metrology target, wherein both the nominal metrology target and the at least one assist metrology target are each characterized by at least one parameter of interest generated by at least two patterning steps of a multiple patterning process.

9. The method of claim 8, wherein a value of a parameter of interest of the at least one assist metrology target differs from a value of the parameter of interest of the nominal metrology target.

10. The method of claim 1, wherein the first amount of measurement data includes measurements of a nominal metrology target at different process steps of the multiple patterning process.

11. A system comprising:
a metrology tool comprising:
an illumination source that provides a first amount of illumination light to a first plurality of measurement sites on a semiconductor wafer, wherein each of the first plurality of measurement sites includes at least one multiple patterned metrology target characterized by at least one parameter of interest generated by at least two patterning steps of a multiple patterning process, wherein the at least one parameter of interest is indicative of a geometric error induced by the multiple patterning process, wherein at least one of the multiple patterned metrology targets located at one or more of the first plurality of measurement sites is different from at least one of another of the multiple patterned metrology targets; and
a detector that detects an amount of light from each of the first plurality of measurement sites in response to the first amount of illumination light provided to each of the first plurality of measurement sites on the semiconductor wafer, the detected amount of light comprising a first amount of optical measurement data; and a computing system configured to:
receive the first amount of optical measurement data associated with the measurements of the first plurality of measurement sites on the semiconductor wafer;
determine a value of the at least one parameter of interest associated with each of the first plurality of measurement sites based on the first amount of measurement data and a signal response metrology (SRM) model, wherein the SRM model is an input-output model measurement model that directly relates the received optical measurement data to a value of the at least one parameter of interest; and
store the value of the at least one parameter of interest in a memory.

12. The system of claim 11, wherein the computing system is further configured to:
receive a second amount of measurement data associated with a second plurality of measurement sites, wherein each of the second plurality of measurement sites includes a multiple patterned metrology target characterized by at least one parameter of interest generated by at least two patterning steps of a multiple patterning process, wherein the at least one parameter of interest characterizing the multiple patterned metrology target is known at each of the second plurality of measurement sites;
determine the SRM measurement model based at least in part on the second amount of measurement data; and
train the SRM measurement model based at least in part on the known values of the at least one parameter of interest.

13. The system of claim 12, wherein the computing system is further configured to:
extract one or more features of the second amount of measurement data by reducing a dimension of the second amount of measurement data, and wherein the determining the SRM measurement model is based at least in part on the one or more features.

14. The system of claim 13, wherein the reducing the dimension of the second amount of measurement data involves any of a principal components analysis, a non-linear principal components analysis, a selection of individual signals from the second amount of measurement data, and a filtering of the second amount of measurement data.

15. The system of claim 11, wherein the first amount of measurement data includes measurements of a nominal metrology target and at least one assist metrology target, wherein both the nominal metrology target and the at least one assist metrology target are each characterized by at least one parameter of interest generated by at least two patterning steps of a multiple patterning process.

16. The system of claim 15, wherein a value of a parameter of interest of the at least one assist metrology target differs from a value of the parameter of interest of the nominal metrology target.

17. The system of claim 11, wherein the first amount of measurement data includes measurements of a nominal metrology target at different process steps of the multiple patterning process.

18. The system of claim 11, wherein the detector is configured to collect light from the target structure at multiple wavelengths, multiple collection angles, or a combination of multiple wavelengths and multiple collection angles.

19. A metrology system, comprising:
an illuminator that provides a first amount of illumination light to a first plurality of measurement sites on a semiconductor wafer, wherein each of the first plurality of measurement sites includes at least one multiple patterned metrology target characterized by at least one parameter of interest generated by at least two patterning steps of a multiple patterning process, wherein the at least one parameter of interest is indicative of a geometric error induced by the multiple patterning process, wherein at least one of the multiple patterned metrology targets located at one or more of the first plurality of measurement sites is different from at least one of another of the multiple patterned metrology targets;
a detector that detects an amount of light from each of the first plurality of measurement sites in response to the first amount of illumination light provided to each of the first plurality of measurement sites on the semiconductor wafer, the detected amount of light comprising a first amount of optical measurement data; and
a non-transitory, computer-readable medium, comprising:
code for causing a computer to receive the first amount of optical measurement data associated with measurements of the first plurality of measurement sites on the semiconductor wafer;
code for causing the computer to determine a value of the at least one parameter of interest associated with each of the first plurality of measurement sites based on the first amount of measurement data and a signal response metrology (SRM) model, wherein the SRM model is an input-output model measurement model that directly relates the received optical measurement data to a value of the at least one parameter of interest; and
code for causing the computer to store the value of the at least one parameter of interest in a memory.

20. The metrology system of claim 19, the non-transitory, computer-readable medium, further comprising:
code for causing the computer to receive a second amount of measurement data associated with a second plurality of measurement sites, wherein each of the second plurality of measurement sites includes a multiple patterned metrology target characterized by at least one parameter of interest generated by at least two patterning steps of a multiple patterning process, wherein the at least one parameter of interest characterizing the multiple patterned metrology target is known at each of the second plurality of measurement sites;
code for causing the computer to determine the SRM measurement model based at least in part on the second amount of measurement data; and
code for causing the computer to train the SRM measurement model based at least in part on the known values of the at least one parameter of interest.

* * * * *